No. 633,580. Patented Sept. 26, 1899.
J. W. DUNN.
MACHINE FOR CUTTING OUT CIGAR WRAPPERS AND BINDERS.
(Application filed Mar. 21, 1899.)
(No Model.) 6 Sheets—Sheet 1.

Fig. 1.

WITNESSES:
Gustave Dieterich
John Kehlenbeck

INVENTOR
John W. Dunn
BY
Chas. C. Gill
ATTORNEY

THE NORRIS PETERS CO., PHOTO-LITHO., WASHINGTON, D. C.

No. 633,580. Patented Sept. 26, 1899.
J. W. DUNN.
MACHINE FOR CUTTING OUT CIGAR WRAPPERS AND BINDERS.
(Application filed Mar. 21, 1899.)
(No Model.) 6 Sheets—Sheet 3.

WITNESSES:
Gustave Dieterich
John Kehlenbeck.

INVENTOR
John W. Dunn
BY
Chas. C. Gill
ATTORNEY

No. 633,580. Patented Sept. 26, 1899.
J. W. DUNN.
MACHINE FOR CUTTING OUT CIGAR WRAPPERS AND BINDERS.
(Application filed Mar. 21, 1899.)
(No Model.) 6 Sheets—Sheet 5.

WITNESSES:
Gustave Dieterich
John Kellenbeck

INVENTOR
John W. Dunn
BY
Chas. C. Gill
ATTORNEY

No. 633,580. Patented Sept. 26, 1899.
J. W. DUNN.
MACHINE FOR CUTTING OUT CIGAR WRAPPERS AND BINDERS.
(Application filed Mar. 21, 1899.)
(No Model.) 6 Sheets—Sheet 6.

WITNESSES
INVENTOR
John W. Dunn
BY
ATTORNEY

UNITED STATES PATENT OFFICE.

JOHN W. DUNN, OF NEWARK, NEW JERSEY, ASSIGNOR TO THE JOHN R. WILLIAMS COMPANY, OF NEW YORK, N. Y.

MACHINE FOR CUTTING OUT CIGAR WRAPPERS AND BINDERS.

SPECIFICATION forming part of Letters Patent No. 633,580, dated September 26, 1899.

Application filed March 21, 1899. Serial No. 709,907. (No model.)

*To all whom it may concern:*

Be it known that I, JOHN W. DUNN, a citizen of the United States, and a resident of Newark, in the county of Essex and State of New Jersey, have invented certain new and useful Improvements in Machines for Cutting Out Cigar Wrappers and Binders, of which the following is a specification.

The invention relates to improvements in machines for cutting out wrappers or binders for cigars and the like, and in the form presented herein said machine is adapted to be operated by power, and comprises a die in the outline of the wrapper or binder to be cut and connected with air-suction for holding the tobacco-leaf over the die, a table encompassing the die and adapted to be lowered and raised, so that after the wrapper or binder has been cut the said table may be raised to a level with the die and utilized by the operator in rolling the cigar, a movable arm carrying a roller across said die to effect the cutting of the wrapper or binder from the leaf, and mechanism connected with the driving-shaft for stopping said movable arm at the end of each of its movements, so as to give the operator an opportunity to roll the then cut wrapper or binder around the bunch or filler tobacco and place a fresh portion of the leaf over the die for the next wrapper or binder to be cut.

The machine embodying the features above briefly referred to and hereinafter fully discussed is intended for the use of a cigar roller or operator, who will start the machine by a foot-treadle after each automatic stoppage thereof and who will place the tobacco-leaf over the die preparatory to the cutting of the wrapper or binder therefrom and then, after the cutting of the wrapper or binder, roll the same around the bunch or filler. When, however, the machine is desired only to cut wrappers or binders, the said table surrounding the die may be omitted, and should it be so desired the said table, even when it is present, may be left stationary, although it will be found to be more convenient to have it movable, so that it may be raised to the level of the die when the bunch or filler is to be rolled within the cut wrapper or binder.

The invention embraces the novel mechanism and combinations of parts for securing the proper movements of the said arm carrying the roller across the die and also embraces new features pertaining to the said roller and to said table which surrounds the die and to other parts of the machine.

The present invention consists in the various novel features of construction and combinations of parts hereinafter described, and more particularly pointed out in the claims, and said invention will be fully understood from the detailed description hereinafter presented, reference being had to the accompanying drawings, in which—

In the drawings the numeral 25 designates the main bed-plate of the machine, and 26 the usual supporting legs or frames therefor.

Figure 1:
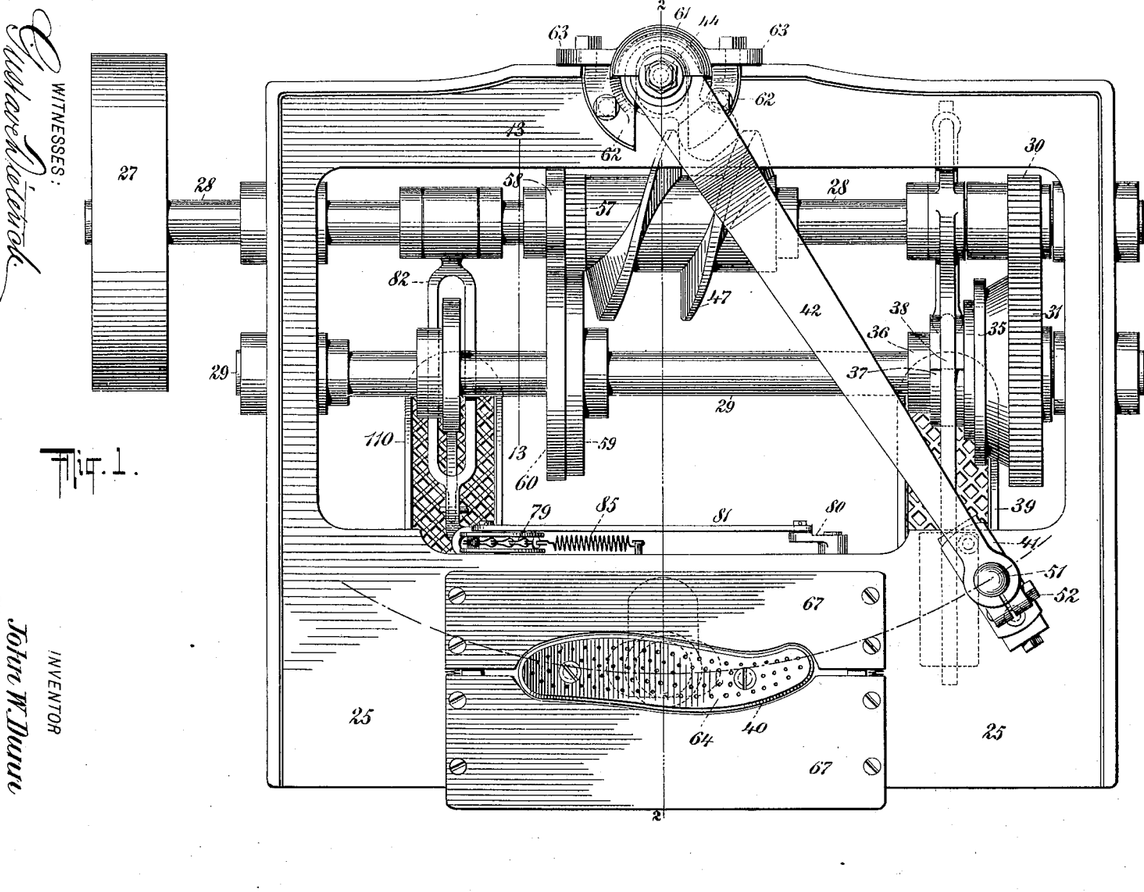
Figure 1 is a top view of a machine constructed in accordance with and embodying the invention.
Figures 10, 11:
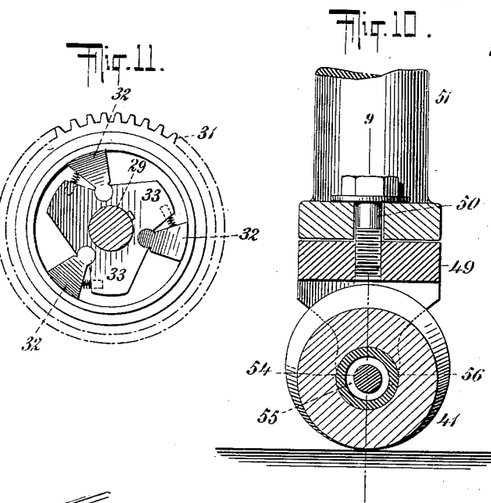
Fig. 10 is a vertical transverse section of same on the dotted line 10 10 of Fig. 9.
Figs. 11 and 12 are respectively plan views of the interior portions of the two parts of the clutch mechanism by which the motion of the driving-shaft may be automatically cut off from the auxiliary shaft at the end of each revolution of the latter.
Figure 12:
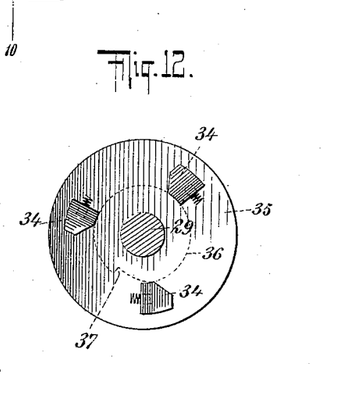

The operative parts of the machine are preferably actuated by power applied to the belt-wheel 27, secured upon the end of a driving-shaft 28, whose motion is imparted to an auxiliary shaft 29 by means of the pinion-wheel 30, secured on the shaft 28 and engaging the gear-wheel 31, loosely mounted upon the auxiliary shaft 29. The gear-wheel 31, as to its interior, is illustrated in Fig. 11 and incloses the clutch-dogs 32 and the plate 33, which is keyed on the shaft 29 and pivotally supports said dogs 32. The outer ends of the dogs 32 are adapted to engage the rim of the wheel 31 and to impart the motion of the shaft 29 to said wheel 31. The shaft 29 is, however, automatically stopped at the end of each of its rotations by the moving away of the outer ends of the dogs 32 from the rim of the wheel 31, and this is accomplished by the arms 34, carried by the disk 35, (see Fig. 12,) and which are normally within the larger spaces intermediate the dogs 32 and the arms of the plate 33. The disk 35 is formed with a hub 36, having a recess 37 adapted to be engaged by the weighted lever-arm 38, which is fulcrumed on the shaft 28 and is adapted to be operated by a foot-treadle 39. In the absence of the weighted lever-arm 38 the shafts 28 and 29 would have a continuous and simultaneous motion; but with the employment of the lever-arm 38 the latter engages the recess 37 at the end of each rotation of the auxiliary shaft 29 and hub 36 and in doing so causes the dogs 32 within the gear-wheel 31 to meet the then stationary arms 34, carried by the disk 35, and to be thereby removed from engagement with the rim of the wheel 31, whereby, although the wheel 31 may continue to rotate, it will not then impart its motion through said dogs and plate 33 to the auxiliary shaft 29. Thus at the end of each rotation of the auxiliary shaft 29 the latter is brought to a stop by the engagement of the weighted lever 38 with the recess 37 of the hub 36. When it is desired that the auxiliary shaft 29 should again operate and perform another rotation, the operator will place his foot upon the foot-treadle 39 and elevate the weighted lever-arm 38 from the hub 36, thus relieving said hub and the disk 35 of any force tending to hold it stationary and permitting the spring-dogs 32 to again engage the inner surfaces of the rim of the gear-wheel 31, the result being that the motion of the gear-wheel 31 will be communicated to the shaft 29 and that the latter will make another rotation until the recess 37 of the hub 36 is again engaged by the lever-arm 38. The recess of the hub 36 is engaged by the lever-arm 38 at the end of each rotation of the auxiliary shaft 29, and said shaft is thereby stopped at the end of each of its rotations. The clutch mechanism indicated in Figs. 1, 11, and 12 is not sought to be claimed in this application and is fully shown and described in an application of even date herewith filed by me for Letters Patent for improvements in cigar-making machines, said application having been filed March 21, 1899, and given Serial No. 709,906. The said clutch mechanism above described constitutes simply one convenient form of clutch for stopping the auxiliary shaft 29 at the end of each of its rotations in a manner well known in this art. The present application is not therefore limited to any special form of clutch mechanism for stopping the auxiliary shaft 29 at the end of each of its rotations, and since various forms of clutch mechanism for accomplishing this result are well known in this art it seems to be unnecessary to further refer to the same.

Figures 9, 13:
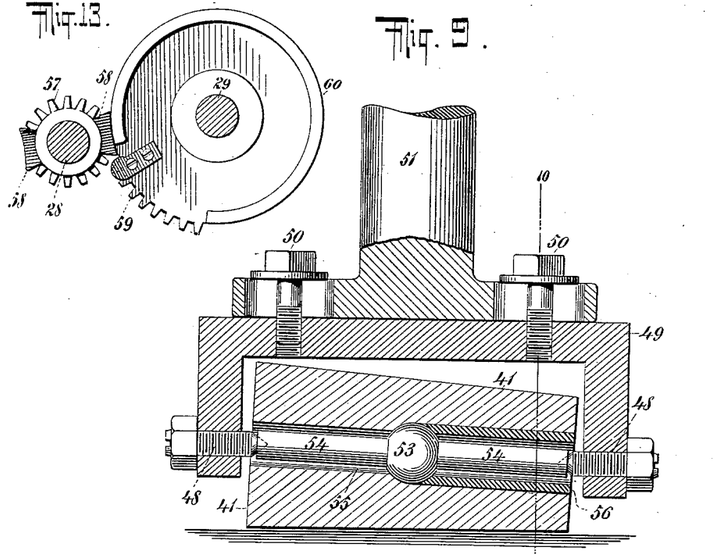
Fig. 9 is an enlarged vertical section through the pressing-roller and its frame, the section being taken longitudinally of said roller and being on the dotted line 9 9 of Fig. 10.
Fig. 13 is a detached transverse section on the dotted line 13 13 of Fig. 1.

The die for cutting wrappers is designated by the numeral 40, and the roller which coöperates with this die in the cutting of the wrappers is indicated by the numeral 41 and is illustrated on an enlarged scale in Figs. 9 and 10. The die 40 is stationary, and the roller 41 is moved over the die and lengthwise thereof by means of the roller-arm 42, which at its front end carries said roller 41 and at its rear end is secured upon the vertical oscillatory shaft or spindle 43, which is mounted upon the pivot-bearings 44 44 (see Fig. 2) and carries at its lower end the inwardly-extending arm 45, having the roller end 46, which is engaged by the blades of the rotatory spiral 47, loosely mounted upon the driving-shaft 28 and adapted to be rotated by motion communicated to it from the auxiliary shaft 29 in the manner hereinafter described. The rotatory motion of the spiral 47 is imparted through the arm 45 to the vertical shaft or spindle 43 and by the latter to the oscillatory arm 42, carrying the roller 41, whereby the latter is caused to pass over the die 40 to effect the cutting of the cigar-wrappers. The arm 42 under action of the spiral 47 moves from the position in which it is illustrated in Fig. 1 to a corresponding position at the other end of the die 40, where it is held pending the manipulation of the then cut wrapper, and thereafter after a fresh portion of the leaf has been placed over the die 40 the arm 42 is returned to its former position. (Shown in Fig. 1.) With each movement of the arm 42 the roller 41, coöperating with the die 40, cuts one wrapper from the tobacco-leaf.

The means for actuating the roller-arm 42 are novel, and said roller 41 is also novel and constitutes a portion of the invention sought to be protected hereby.

Figure 2:
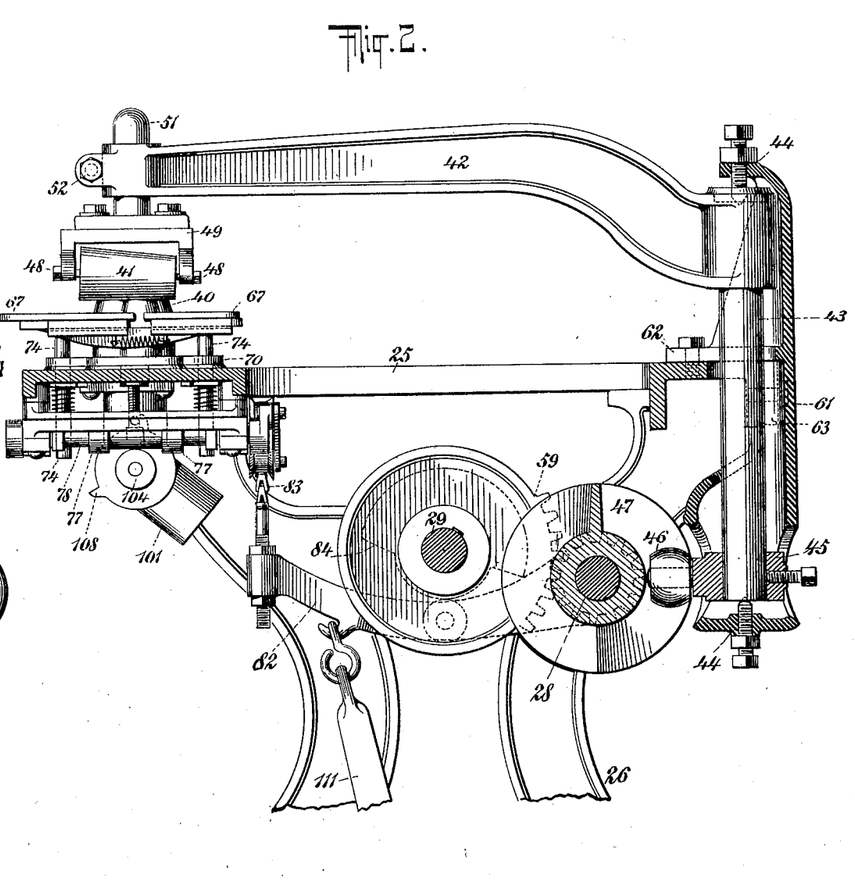
Fig. 2 is a central vertical transverse section of same on the dotted line 2 2 of Fig. 1.
Figure 3:
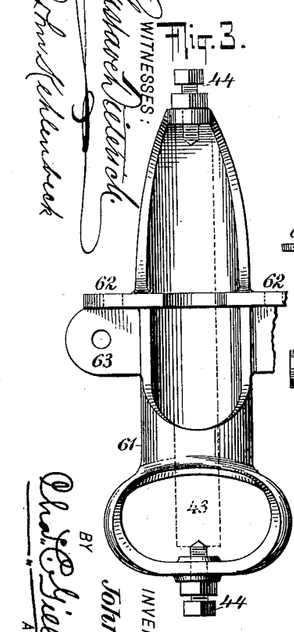
Fig. 3 is a detached front elevation, partly broken away, of a cast-frame which in use is applied at the rear end of the bed-plate of the machine and receives the vertical shaft to which the roller-carrying arm is secured.

The roller 41 is tapered, as illustrated in Figs. 2 and 9, and mounted upon the pivot-bearings 48 48, carried by a frame 49, which is, by means of screws 50 50, (see Fig. 9,) secured to the rod 51, which passes upward through an opening in the split front end of the roller-arm 42 and is therein clamped by means of a clamping-screw 52. The novel features connected with the roller 41 pertain to the taper form of said roller and to the manner of mounting the same, and these features are fully illustrated in Figs. 9 and 10, in which it will be seen that the roller 41 is in the form of a truncated cone and is mounted upon a substantially central ball-bearing 53, which is integral with the shaft 54, the latter passing longitudinally and centrally through the roller 41 and being engaged at its ends by the aforesaid bearings 48. Within the interior of the roller 41 is formed the chamber 55, through which the shaft 54 passes and which affords sufficient space around said shaft to enable the yielding of the roller 41 to any irregularities in the surfaces of the tobacco-leaf or the cutting-die, over which it passes. The ball 53 has a direct bearing against the interior of the roller 41, as shown in Fig. 9, and in order that the ball 53 may reach the central portion of the chamber 55 one end of the latter is made normally of greater diameter than the other end thereof, and after the shaft 54 and ball 53 have been introduced within the roller 41 a sleeve 56 is introduced into the enlarged end of the chamber 55, so as to reduce the diameter of said end of said chamber and at its inner curved edges to aid in forming a bearing for the ball 53, as shown in Fig. 9. The roller 41 is secured to the frame 49, carried by the roller-arm 42, by means of the screws 48 48; but said roller 41 in its coöperative action with the die 40 is mounted upon the central bearing 53, and consequently said roller 41, while moving over the die 40, may not only freely rotate, but may yield to any irregularity or unevenness in the surfaces over which it passes, and this yielding of the roller 41 is from a central point, and hence the roller 41 may exert its uniform pressure, but assume an inclination conforming to the surface over which it may pass. When the roller 41 is constructed and mounted in the manner illustrated in Fig. 9, it is entirely efficient in the cutting of the wrappers and disposes with the common custom heretofore employed of using two rollers for moving across the cutting-die of cigar-wrapper-cutting machines. The roller constructed and mounted as shown in Fig. 9 may have a rocking yielding motion to the surfaces over which it may pass, and it may also have a rocking yielding motion laterally, whereby it is rendered more adaptable for use as an individual roller in connection with the oscillating arm 42. The yielding motion of the roller 41 is of a pivotal character from a central point, and the extent of this motion will be governed by the amount of space left between the walls of the inner chamber 55 and the outer surfaces of the shaft 54. I regard the taper-roller mounted upon a ball-bearing, as shown, as a substantial advance in this art.

The oscillatory motion of the arm 42, carrying the roller 41, is, as above explained, communicated from the spiral 47 through the arm 45 to the vertical shaft or spindle 43 and by the latter to the arm 42, and I have explained above that the arm 42 is temporarily locked at the end of each of its movements. I will now proceed to describe the means for actuating the spiral 47 and also the means for locking the arm 42 at the end of each of its movements, and upon reference to Figs. 1 and 2 it will be seen that the spiral 47, which is loose upon the shaft 28, is integral with the pinion-wheel 57 and locking-plate 58 and that the pinion-wheel 57 is adapted to be engaged by the segmental gear-wheel 59, rigidly mounted upon the auxiliary shaft 29. The segmental gear-wheel 59 is integral with a plain rim 60, (see Figs. 1 and 13,) which after the segmental gear 59 leaves the pinion-wheel 57 engages the locking-plate 58 and prevents the latter, with the wheel 57 and spiral 47, from rotating, without interfering, however, with the continued rotation of the auxiliary shaft 29. During the rotary motion of the auxiliary shaft 29 the segmental gear 59 and the rim 60 make a complete rotation, and during this rotation the teeth of the segmental gear 59 will engage the pinion 57 and cause the latter, with the spiral 47 and locking-plate 58, to rotate, whereby said spiral is enabled, through the arm 45 and vertical shaft 43, to move the roller-arm 42 across the die 40. Immediately after the teeth of the segmental gear 59 leave the pinion-wheel 57 the curved surfaces of the rim 60 pass into engagement with the locking-plate 58 and serve to lock said plate 58, with the pinion-wheel 57 and spiral 47, stationary, and thus after the roller-arm 42 has completed its motion it is held temporarily in stationary position by reason of the fact that the rim 60 will then engage the locking-plate 58 and hold the spiral 47 against movement. During such time as the teeth of the segmental gear are not in engagement with the pinion-wheel 57 the rim 60 will be in engagement with the locking-plate 58 and prevent any movement in the spiral 47. When the tobacco-leaf has been spread over the die 40 and the friction-clutch has been relieved so that the driving-shaft 28 may, through the gear-wheels 30 31, actuate the auxiliary shaft 29, the segmental gear 59 will, through the gear-wheel 57, actuate the spiral 47 and the latter will move the roller-arm 42 from the position in which it is shown in Fig. 1 to a corresponding position at the other end of the die 40, and during this movement of the roller-arm 42 the roller 41 will effect the proper pressure to insure the cutting of the wrapper by means of the die. After the roller-arm 42 has made the movement just described across the die it will be there locked by reason of the fact that the segmental gear 59 will then have left the pinion-wheel 57 and the rim 60 will then be in engagement with the locking-plate 58. It is desired that the arm 42 should be thus locked at the end of its motion, since the cut wrapper being then on the die the operator will desire to roll the bunch within this wrapper while the latter is being held by air-suction. The spiral 47 and roller-arm 42 are brought to a rest prior to the completion of the one rotation of the auxiliary shaft 29 for the reason that a continued motion of said shaft 29 is desired in order that it may perform the further duty, hereinafter described, connected with the table which surrounds the die 40. The spiral 47 for actuating the roller-arm 42 presents a desirable feature in that the movement of the arm 42 becomes thereby uniform, positive, and regular and that the locking of the spiral 47 furnishes an effectual lock for the arm 42. The vertical shaft or spindle 43, carrying the arm 42, and which is actuated by the spiral 47, is mounted within the frame 61, which is in one integral piece and is bolted upon the rear portion of the bed-plate 25, as illustrated in Figs. 1 and 2. The pivot-bearings 44 44 for the vertical shaft 43 are carried by the cast-frame 61 and are in alinement with one another. The cast-frame 61 is substantially semicylindrical in horizontal cross-section and is formed with the flanges 62, which are bolted upon the top of the bed-plate 25, and with the vertical flanges 63, which are bolted against the rear side of the bed-plate 25. The cast-frame 61 may, owing to its form and construction, be quickly and readily applied to the bed-plate 25, and since said frame is in one integral piece the pivot-bearings 44 44, carried thereby, are preserved in due alinement with one another, which is a very important consideration.

The die 40 is in one integral piece and in the outline of the wrapper or binder to be cut, and said die is hollow and encompasses at its upper edges a perforated platen 64, which is mounted upon yielding rods 65 65, which are encompassed by coiled springs 66, (shown in Figs. 4 and 5,) as is usual in this art. The die 40 is encompassed at its opposite sides by the usual plates 67 67, to the under side of whose ends are fastened by screws the recessed pieces 68 68, Fig. 4, which furnish means for sliding said plates 67 upon the flanged edges of the rectangular skeleton frame 69, which supports said plates 67 67 and is movable vertically, so that said plates 67 may be brought upward to the level of the upper edges of the die 40 and be made to form a rolling-table for the convenience of the operator in rolling cigars. The plates 67 67 are also of known form and utility in this art. The die 40 remains stationary at all times, and it is secured upon the plate 70 by means of the clamps 71, (shown by dotted lines in Figs. 4 and 8 and by full lines in Fig. 5,) which clamps have reduced inner ends to enter apertures in the sides of the die 40 and are themselves held upon the plate 70 by means of the screws 72. The clamps 71 are formed with the elongated slots 73, (shown in Fig. 8,) which admit of an outward-sliding motion of said clamps 71 from the die 40 after the screws 72 have been loosened. Thus in removing the die 40 from the plate 70 it will not be necessary to entirely detach the screws 72 and clamps 71, but simply to loosen the screws 72 and slide the clamps 71 outward from the die 40.

The rectangular frame 69, supporting the plates 67 67, which form the rolling-table, is illustrated in top elevation in Fig. 7, in which it will be seen that said frame is of skeleton form and is by means of screws 24 secured upon the upper ends of four rods 74, (shown more clearly in Figs. 2, 4, and 5,) which rods 74 pass downward below the bed-plate 25 and are secured within collars 75, forming a part of the horizontal plate 76, which is movable vertically and imparts its motion through the rods 74 to the skeleton frame 69 and the table-plates 67, carried thereby. The movable plate 76 is not broadly new, and said plate 76 receives its vertical motion from the toes or cams 77, mounted upon the horizontal shafts 78 and adapted to be turned upward against said plate 76, so as to elevate the same. The horizontal shafts 78 have a simultaneous motion in opposite directions by reason of the fact that one of said shafts carries the segment 79 and the other shaft the crank 80 and that the said segment and crank are connected together by the rod 81 in the manner illustrated in Figs. 1, 4, and 7. The segment 79, crank 80, connecting-rod 81, shafts 78, and toes 77 are not of themselves claimed herein. The motion of the segment 79 is imparted in a well-known manner to the shafts 78 and toes 77 to elevate the plate 76 and frame 69, and said segment receives its motion from the lever 82, fulcrumed on the driving-shaft 28 and connected by a chain 83 with said segment, and said lever 82 is actuated to pull downward on said chain 83 and segment 79 to elevate the plate 76 by means of the cam 84, secured upon the auxiliary shaft 29, as shown by full lines in Fig. 1 and by dotted lines in Fig. 2. The lever 82 is kept against the cam 84 by means of the coiled spring 85, (see Fig. 1,) which exerts a tension against the segment 79 and draws on the latter to turn the toes 77 downward and pull upward on the chain 83 and lever 82. The operation of the cam 84 is to secure the elevation of the plate 76 and frame 69, with the table-plates 67, after the roller-arm 42 has passed across the die 40 and has come to a stop and to permit the lowering of said plate 76, frame 69, and plates 67 after the rolling of the cigar has been completed and it is desired to cut a wrapper for the subsequent cigar to be rolled. The auxiliary shaft 29 continues its motion after the roller-arm 42 has come to a stop simply for the purpose of permitting the cam 84 to operate, this cam performing its function after the spiral 47 has ceased its operation.

Figure 4:
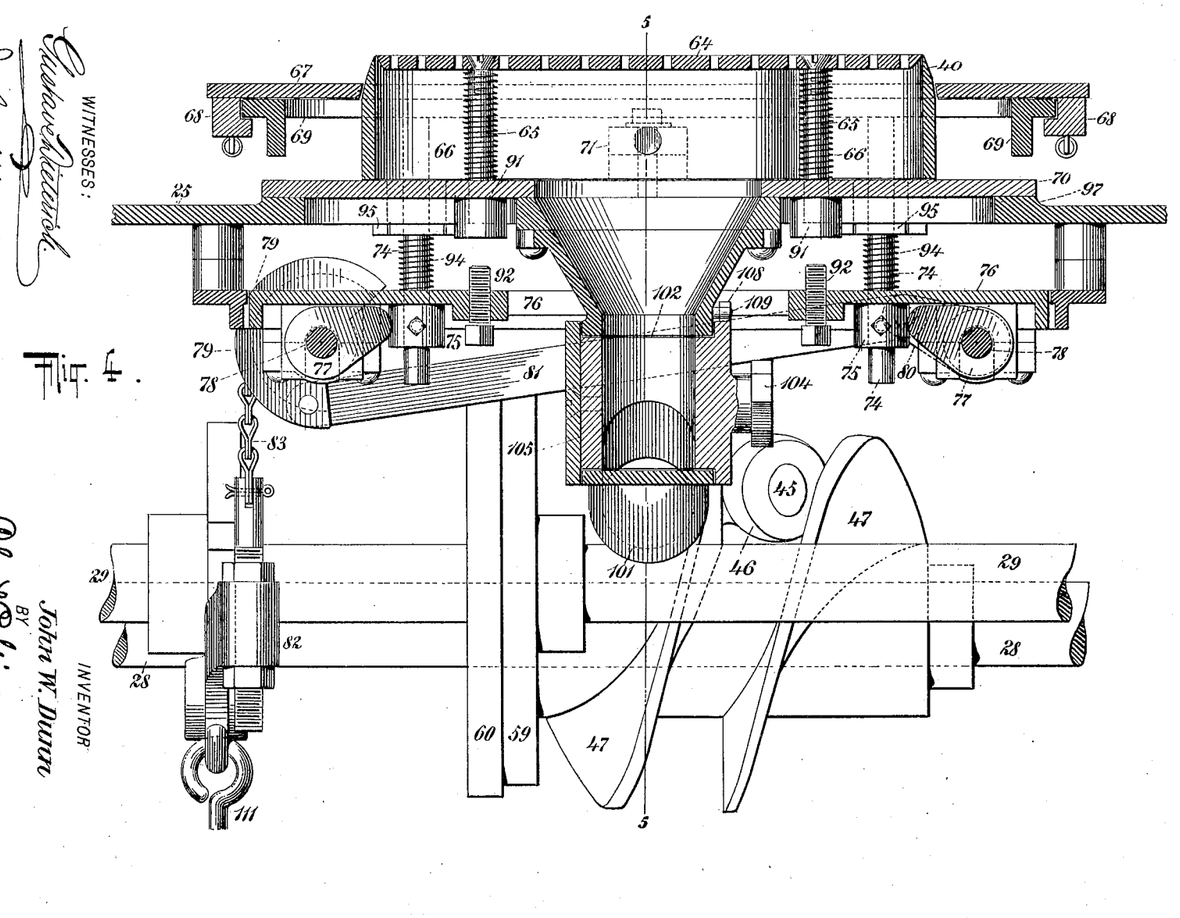
Fig. 4 is an enlarged vertical longitudinal section, partly broken away, through the cutting-die and table of the machine, the section being taken on the dotted line 4 4 of Fig. 5.
Figures 5, 6:
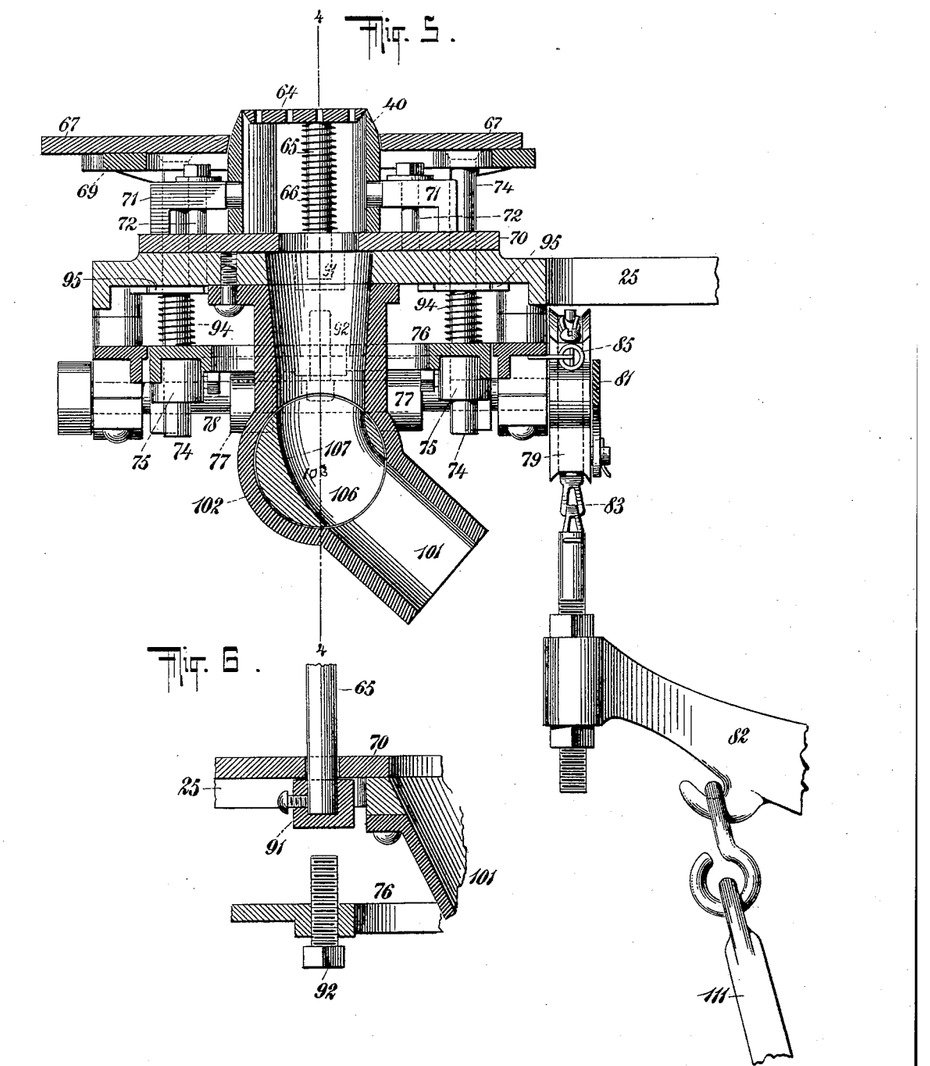
Fig. 5 is an enlarged vertical transverse section of same on the dotted line 5 5 of Fig. 4.
Fig 6 is an enlarged detail in section of a portion of the rolling-table mechanism, this section corresponding with Fig. 4.

There are several new features connected with the rolling-table mechanism, and I will endeavor to point them out. The fact that the die 40 is secured to the plate 70 by means of the clamps 71 is of advantage, since the plate 70 is removable from the main bed-plate 25, and hence it becomes very easy to change the die 40 and substitute another die therefor. The plate 70 and the die 40 are connected together and both may be lifted from the machine together, and said die and plate are secured to the main bed-plate of the machine by means of simple button-clamps 90, (shown in Fig. 7,) which clamps are fastened by screws or bolts, as indicated, and at their inwardly-extending ends simply overlap the edges of the plate 70. By loosening the button-clamps 90 the plate 70 and die 40 may be readily lifted from the machine. The die 40 is held upon the plate 70 by means of the rods 65, (shown in Figs. 4 and 5,) which pass through apertures in said plate 70 and at their lower ends carry the caps 91, as shown in Figs. 4, 6, and 8. The caps 91 permit of the depression of the perforated platen 64, but prevent said platen from having any undue upward movement.

The vertically-movable plate 76, while not broadly new, possesses the novel feature of being provided, directly below the caps 91 above referred to, with the adjustable stop-screws 92, which when the plate 76 is moved upward will contact with the bottoms of the caps 91 and prevent said plate 76 from having any undue upward motion. The whole purpose of moving the plate 76 upward is to bring the rolling-table plates 67 into parallelism with the upper edge of the die 40, and the adjustment of the stop-screws 92 should be such that the rolling-table plates 67 will be arrested when they arrive at a level with the upper edge of the die 40. The adjusting-screws 92 permit the upward movement of the plate 76 and rolling-table plates 67 to be regulated in accordance with the height of the die 40 and other circumstances.

Figure 7:
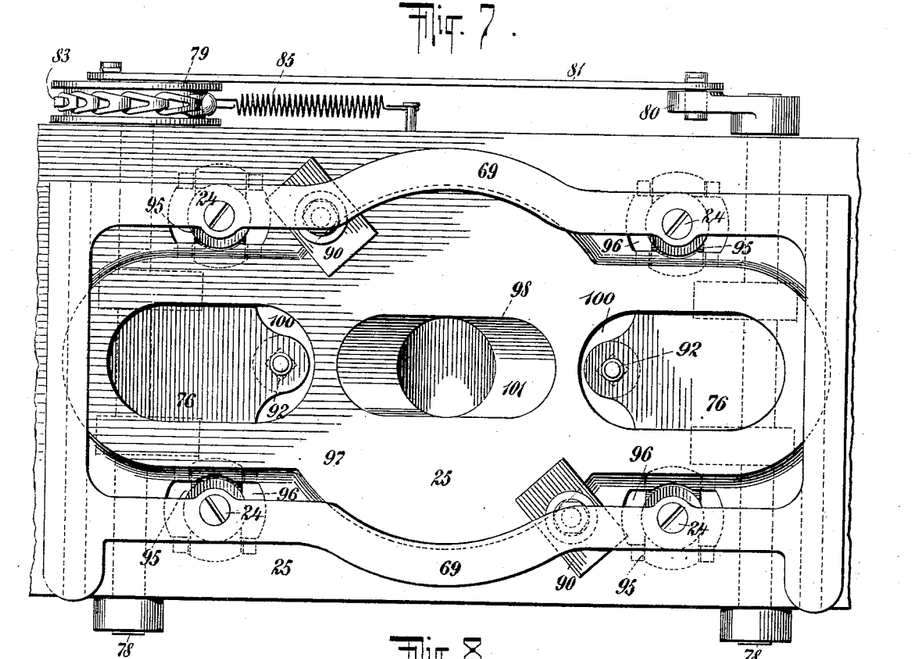
Fig. 7 is an enlarged detached top view of a portion of the main bed-plate and rolling-table mechanism, the die and its platen, the die-plate, and the top plates of the table being omitted.
Figure 8:
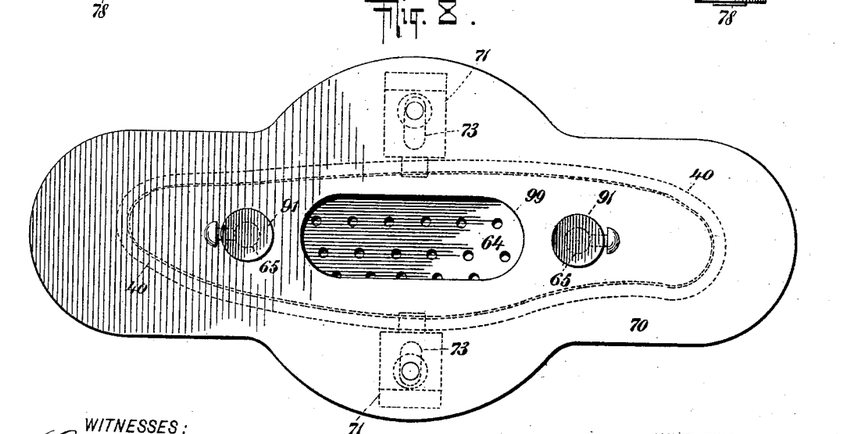
Fig. 8 is a bottom view of the plate carrying the die, the latter and the clamps for securing it in position being indicated by dotted lines.

It has been described above that the skeleton frame 69, which carries the rolling-table plates 67, is connected with the vertically-movable plate 76 by means of the four rods 74, which are fastened by screws 24 at their upper ends to said skeleton frame, as shown in Fig. 7, and at their lower ends are secured in hubs 75, formed on said plate 76. Upon the rods 74 are provided the coiled springs 94, which exert a downward tension upon the vertically-movable plate 76, and these springs 94 are held as to their upper ends by means of the buttons 95, whose outline is indicated in Fig. 7, and which are loose upon the rods 74 and are kept in contact with the springs 94 by having their ends turned below the bed-plate 25. The bed-plate 25, as shown in Fig. 7, is formed with the apertures 96, which admit of the buttons being pushed directly downward through the same when said buttons are in alinement with said apertures, and after the buttons have been pressed downward through the apertures 96 said buttons are turned at right angles across said apertures, as shown in Fig. 7, so that their ends pass below the bed-plate 25. The buttons 95 are thus held upon the rods 74 between the lower surfaces of the bed-plate 25 and the upper ends of the springs 94, and when desired said buttons may be released by simply turning them into alinement with the apertures 96, which will then permit them to be moved directly upward on the rods 74 and free of the springs 94 and bed-plate 25. The buttons 95 thus form a very convenient means of maintaining the pressure on the springs 94, and at the same time they will permit, when turned into alinement with the apertures 96, of the withdrawal of the skeleton frame 69 and rods 74 from the machine. Upon the withdrawal of the skeleton frame 69 and rods 74 from the machine the buttons 95 are released and the lower ends of the rods 74 are released from the hubs 75 of the plate 76. The hubs 75 of the plate 76 extend below the lower surface proper of said plate, and screws are provided for fastening the lower ends of the rods 74 within said hubs. The rods 74 are thus adjustable within the hubs 75, and consequently the height of the skeleton frame 69 may be regulated in accordance with the height of the die 40 and other circumstances.

The main bed-plate 25 is formed with a slightly-raised seat 97, as shown in Figs. 4 and 7, conforming to the outline of the plate 70, which carries the die 40, and said bed-plate 25 within the outline of the said seat 97 is formed with the elongated opening 98 to correspond with the elongated opening 99, formed in the said plate 70, as shown in Figs. 7 and 8, and the bed-plate 25 within the outline of said seat 97 is formed with the end openings 100, which admit of the upward movement of the stop-screws 92, connected with the vertically-movable plate 76. The opening 98 in the bed-plate 25 and the opening 99 in the die plate 70 admit of air-suction being applied to hold the wrapper upon the die 40, and this suction is created by the usual suction-blower in a manner well-known in this art. The suction is applied through the air-pipe 101, which will be connected, as usual, with pipes leading to the suction-blower and is funnel-shaped at its upper end, which, as shown in Figs. 2 and 5, is secured to the lower surfaces of the bed-plate 25. The upper funnel-shaped end of the air-pipe 101 conforms to the outline of the openings 98 and 99 in the bed-plate and die-plate 70, respectively, and the said air-pipe 101 is, below its funnel-shaped upper end, constructed to form the circular valve-casing 102, within which is placed the valve 103, which is adapted to have a rocking or oscillatory motion and may be operated by taking hold of the lug or handle 104. (Shown in Fig. 4.) The valve 103 is set within the casing 102 and is retained therein by means of an end plate 105, as shown in Fig. 4. The valve 103 is formed with the curved port 106, as more clearly shown in Fig. 5, which when the valve is in its open position forms an even and regular continuation of the inner surfaces of the air-pipe 101, as indicated in Fig. 5, whereby said valve 103 when in its open position presents no angular obstructions to the flow of the air, but on the contrary is so formed with reference to the inner surfaces of the air-pipe 101 that its port 106 simply forms a continuation of said surfaces. When the valve 103 is turned to its closed position, it effectually cuts off the discharge through the air-pipe 101, the portion 107 of the valve at this time being turned upward and across the passage through the air-pipe 101. The valve 103 will be formed with stops 108, as shown in Figs. 1 and 4, which when the valve is turned will alternately engage the stop-pin 109, Fig. 4, and limit the throw of said valve 103. The valve 103 will be turned to close the air-pipe 101 when it is not desired that the air-suction shall be applied to the die 40, and the said valve will be turned to open said air-pipe 101 when it is desired that air-suction shall be applied to the die 40.

The operation of the machine will in the main be understood from the foregoing description. The power is applied to the belt-wheel 27 and driving-shaft 28, and said shaft 28, through the gear-wheels 30 31, will actuate the auxiliary shaft 29, the latter automatically stopping at the end of each of its rotations, as hereinbefore described, and being again started by relieving the clutch mechanism by the pressure of the foot upon the treadle 39, as usual in machines of this character. The auxiliary shaft 29 is relied upon to actuate the operative parts of the machine. The tobacco-leaf will be spread over the die 40 and will be there held by air-suction, and thereupon, the machine having been set in motion, the segmental gear-wheel 59 will engage the pinion-wheel 58 and impart a rotary motion to the spiral 47, which will, as hereinbefore described, cause the roller-arm 42 to move across the die 40, the roller 41 during this movement of the arm 42 serving to press the leaf upon the die 40 and to effect the cutting of the wrapper therefrom. After the arm 42 has moved across the die 40 to effect the cutting of the wrapper it will be locked at the end of its motion by the engagement of the rim 60 on the segmental gear 59 with the locking-plate 57, which is integral with the pinion-wheel 58 and spiral 47. The spiral 47 and roller-arm 42 being thus locked in rigid position, the auxiliary shaft 29 will continue its motion and the cam 84 thereon will by pressing downward on the lever 82 cause the segment 79 and crank 80 to rotate the shafts 77 and turn the toes 78 upward to elevate the plate 76, skeleton frame 69, and table-plates 67 to their upper position, whereby said plates 67 are brought into alinement with the upper edges of the die 40, and thus serve, in connection with the platen 64, as a rolling-table upon which the bunch may then be rolled into the wrapper then held upon said platen by the air-suction. Since the machine comes to a stop at the end of the rotation of the auxiliary shaft 29, the operator will have abundant time to roll the cigar and place a fresh leaf of tobacco upon the die 40 preparatory to the cutting of another wrapper. Just prior to the stoppage of the shaft 29 the cam 84 releases its pressure upon the lever-arm 82, and hence when the machine does come to a stop the plate 76 and table-plates 67 will have reached their lower positions, and thus when the machine has come to a stop it will be in proper condition to receive the fresh tobacco-leaf over the die 40. After the leaf of tobacco shall have been placed over the die 40 the operator will again start the machine into action by the pressure of the foot upon the treadle 39 and the above-described operation will be repeated, the arm 42 moving back to its former position across the die 40 and cutting another wrapper and then being locked in position during the continued motion of the auxiliary shaft 29 to raise the table-plates 67. If for any reason the operator should not have concluded the rolling of the cigar at the time of the stoppage of the auxiliary shaft 29, the table-plates 67 may be continued in their elevated position by the pressure of the foot upon the treadle 110, Fig. 1, connected by an ordinary pitman-rod 111 with the aforesaid lever-arm 82, as shown in Fig. 2. When the pressure of the foot is maintained upon the treadle 110, the table-plates 67 will be retained in their upper positions.

What I claim as my invention, and desire to secure by Letters Patent, is—

1. In a machine of the character described, the die in the outline of the wrapper or binder to be cut, combined with the oscillatory roller-arm, means for actuating the latter, the tapered roller carried by said arm, and a bearing at the interior of said roller and allowing the latter to have a rocking motion but at the same time preventing said roller from having endwise motion; substantially as set forth.

2. In a machine of the character described, the die in the form of the wrapper or binder to be cut, and the roller to coöperate with said die in cutting the wrapper or binder, combined with the shaft passing freely through said roller and having a bearing at its central portion for the interior of said roller, a frame engaging the ends of said shaft, and means connected with said frame for moving said roller across said die the said roller having at its interior a recess to receive said bearing, whereby said roller becomes locked against endwise movement on said shaft but may have a rocking motion on said bearing; substantially as set forth.

3. In a machine of the character described, the die in the outline of the wrapper or binder to be cut, and the tapered roller for coöperating with said die, said roller having the longitudinal chamber through it, combined with the shaft passing through said chamber and having the central bearing for said roller, the sleeve within the larger end of said chamber and forming a part of the surface for said bearing and being free of said shaft, the frame rigidly engaging the ends of said shaft, the oscillatory arm carrying said frame and roller, and means for actuating said arm to move said roller across the die; substantially as set forth.

4. In a machine of the character described, the die in the outline of the wrapper or binder to be cut, and the tapered roller for coöperating with said die, combined with a frame carrying said roller, and a bearing within said roller and upon which said roller is permitted to have a yielding or rocking motion but which locks said roller against endwise movement; substantially as set forth.

5. In a machine of the character described, the die in the outline of the wrapper or binder to be cut, and the oscillatory arm and roller for coöperating with said die, combined with the vertical shaft to which said arm is secured, the lower arm secured upon said shaft, the spiral engaging said lower arm for operating the same and said oscillatory arm, and means for imparting rotary motion to said spiral; substantially as set forth.

6. In a machine of the character described, the die, the roller for coöperating therewith, the oscillatory arm carrying said roller, the vertical shaft to which said arm is secured, and the lower arm secured upon said shaft, combined with the spiral engaging said lower arm for operating said oscillatory arm, means for imparting rotary motion to said spiral to cause the latter to move said roller across the die, and means for locking said spiral in stationary position after said oscillatory arm has performed its movement; substantially as set forth.

7. In a machine of the character described, the die, the roller for coöperating therewith, the oscillatory arm carrying the roller, the vertical shaft to which said arm is secured, and the lower arm secured upon said shaft, combined with the spiral engaging said lower arm for actuating said oscillatory arm and roller, the pinion-wheel and locking-plate connected with said spiral, the segmental gear and locking-rim for respectively engaging said pinion and locking-plate, and means for operating said segmental gear and rim; substantially as set forth.

8. In a machine of the character described, the die, the roller for coöperating therewith, and means for carrying and operating said roller, combined with the air-suction pipe 101 communicating with said die and having the valve-casing 102, the oscillatory valve 103 within said casing and having the handle 104 by which said valve may be manually operated, and stops for limiting the throw of said valve, the said valve being formed with the port 106 of substantially the same diameter as that of the air-pipe 101 and adapted to form, when in its open position, a continuation of the inner surfaces of said pipe 101, and said valve 103 having the portion 107, which when the valve 103 is turned to closed position, will cut off the passage for the air through said pipe; substantially as set forth.

9. In a machine of the character described, the die, the roller for coöperating therewith, the roller-arm, and the oscillatory shaft to which said roller-arm is secured, combined with means for actuating said shaft, and the frame or casing 61 for said shaft, said casing being in one integral piece and carrying at its ends the pivot-bearings 44 for said shaft, and also being provided with the flanges for securing said casing 61 to the bed-frame of the machine; substantially as set forth.

10. In a machine of the character described, the die, the roller for coöperating therewith, and means for moving said roller across said die to effect the cutting of the wrappers, combined with the die-plate 70 upon which said die is held, the clamps for securing said die upon said plate, and means for removably securing said die-plate upon the bed of the machine; substantially as set forth.

11. In a machine of the character described, the cutting-die, the roller for coöperating therewith, and means for moving said roller across said die, combined with the platen within the outline of said die, the rods supporting said platen, the springs for said rods, the caps on the lower ends of said rods, the vertically-movable plate below the bed-plate of the machine, the skeleton frame supporting the table-sections above said bed-plate, the rods connecting said skeleton frame with said movable plate, means for moving said plate vertically to elevate the table-plates, and the adjustable stop-screws carried by said lower plate and adapted to contact with said caps when said plate has reached its desired upward position; substantially as set forth.

12. In a machine of the character described, the die, the roller coöperating therewith, and means for moving said roller across said die, combined with the skeleton frame 69 above the bed-plate of the machine, the movable plate 76 below said bed-plate, the rods 74 connecting said skeleton frame and said plate 76, means for elevating said plate 76, the springs on said rods 74, and the buttons 95 on said rods and adapted to be passed downward through the apertures 96 in the bed-plate and then turned crosswise of said apertures while pressing on said springs; substantially as set forth.

Signed at New York, in the county of New York and State of New York, this 14th day of March, A. D. 1899.

JOHN W. DUNN.

Witnesses:
CHAS. C. GILL,
E. JOS. BELKNAP.